(12) United States Patent
Kyker et al.

(10) Patent No.: US 6,591,344 B2
(45) Date of Patent: *Jul. 8, 2003

(54) METHOD AND SYSTEM FOR AN INUSE FIELD RESOURCE MANAGEMENT SCHEME

(75) Inventors: Alan B. Kyker, Portland, OR (US); Darrell D. Boggs, Aloha, OR (US)

(73) Assignee: Intel Corporation, Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 10/218,628

(22) Filed: Aug. 15, 2002

(65) Prior Publication Data

US 2003/0023816 A1 Jan. 30, 2003

Related U.S. Application Data

(63) Continuation of application No. 09/475,746, filed on Dec. 30, 1999, now Pat. No. 6,467,027.

(51) Int. Cl.[7] ............................................. G06F 12/00
(52) U.S. Cl. ................... 711/125; 711/117; 711/123; 711/202; 711/206; 711/205; 712/205; 712/226
(58) Field of Search ........................ 711/125, 128, 711/207, 205, 133, 3, 120; 712/23, 205, 226, 32, 34; 703/26

(56) References Cited

U.S. PATENT DOCUMENTS

| | | | |
|---|---|---|---|
| 4,989,140 A | * | 1/1991 | Nishimukai et al. ........ 711/207 |
| 5,649,155 A | * | 7/1997 | Krumm et al. ............. 711/128 |
| 5,687,338 A | * | 11/1997 | Boggs et al. ............... 712/205 |
| 5,692,167 A | * | 11/1997 | Grochowski et al. ....... 712/226 |
| 5,953,520 A | * | 9/1999 | Mallick ...................... 703/26 |
| 6,115,793 A | * | 9/2000 | Gruber et al. .............. 711/133 |
| 6,128,723 A | * | 10/2000 | Nguyen et al. .............. 712/23 |
| 6,212,603 B1 | * | 4/2001 | McInerney et al. ......... 711/125 |
| 6,298,411 B1 | * | 10/2001 | Giacalone ..................... 711/3 |
| 6,467,027 B1 | * | 10/2002 | Kyker et al. ................ 711/125 |

FOREIGN PATENT DOCUMENTS

EP         0 523 337         1/1993

OTHER PUBLICATIONS

Herrman B D et al.: Prefetching Mechanism That Accommodates A Self–Modifying Code IBM Technical Disclosure Bulletin, US, IBM Corp., New York, vol. 27, No. 7A, Dec. 1, 1984, pp. 3694–3696.

* cited by examiner

Primary Examiner—Matthew Kim
Assistant Examiner—Zhuo H. Li
(74) Attorney, Agent, or Firm—Kenyon & Kenyon

(57) ABSTRACT

A method for maintaining an instruction in a pipelined processor using inuse fields. The method involves receiving a read request for an instruction, sending the instruction in response to the read request and setting an inuse field associated with the instruction to inuse. Alternate embodiments of the method involve transmitting the instruction in response to the read request, receiving a notification of instruction retirement and resetting the inuse field in the ITLB. The method can also be used in the ICACHE in which inuse fields are associated with each instruction stored in the ICACHE. Other embodiments of the method can be used concurrently in the ITLB and the ICACHE as a resource tracking mechanism to maintain resources.

34 Claims, 8 Drawing Sheets

METHOD AND SYSTEM FOR AN INUSE FIELD RESOURCE MANAGEMENT SCHEME

CROSS REFERENCE TO RELATED APPLICATIONS

This application is a continuation of application Ser. No. 09/475,746 filed Dec. 30, 1999, now U.S. Pat. No. 6,467,027, which is incorporated herein in its entirety by reference thereto.

FIELD OF THE INVENTION

The present invention relates to computer systems. In particular, the invention relates to a resource management scheme for caches and buffers.

BACKGROUND

In general, early microprocessors processed program instructions one at a time. In these early microprocessors, the architectural programming model exposed the atomic nature of instruction execution.

To increase performance, newer microprocessors began overlapping the processing of instructions and executing some parts of the instructions in an order different from the order in which they arrived at the processor. The process of overlapping the processing of instructions is called "pipelining" and microprocessors in which pipelining is implemented are called "pipelined microprocessors." The process of executing instructions in an order different from program order is called "out of order execution." "Program order" is the order in which a hypothetical non-pipelined processor would execute the instructions. However, the newer processors still maintain the illusion of sequential and atomic instructions in order to maintain the existing programming model.

FIG. 1 illustrates a simplified block diagram of a prior art microprocessor 101 designed to execute the Intel Architecture (IA-32) instructions as defined in Intel Corporation Manual, Intel Architecture Software Developer's Manual—Vols. I, II and III, published 1997. A next instruction process 110, which is also referred to as an instruction sequencer, is a state machine and branch prediction unit that builds the flow of execution of the microprocessor 101. To support page table virtual memory accesses, the microprocessor 101 includes an instruction translation look aside buffer (ITLB) 112. The ITLB includes page table entries of linear to physical address translations. Usually the page table entries represent the most recently used page translations. Instructions are fetched over a memory bus 124 by a memory controller 115 from a memory 104 for storage into an instruction cache (ICACHE) 114. The ICACHE 114 is physically addressed. Copies of instructions within memory 104 are stored within the instruction cache 114. Instructions are taken from instruction cache 114, decoded by the instruction decoder 116 and input into an instruction pipeline within an out of order core execution unit 118. Upon completion by the out of order core execution unit 118, an instruction is retired by the retirement unit 120. The retirement unit 120 processes instructions in program order after they have completed execution. "Program order" means the order in which the instructions were received in the out of order core execution unit 118. Retirement processing includes checking for excepting conditions and committing changes to architectural state. That is, the out of order core execution unit 118 executes instructions which can be completely undone before being output by the microprocessor if some excepting condition has occurred which the retirement unit has recognized.

Unfortunately, the illusion of sequential atomic instructions is difficult to maintain in the presence of dynamic code modifications, i.e., self-modifying code (SMC), and operating system maintained TLB consistency. The Intel Corporation Pentium® Pro solved the problems associated with SMC and software maintained TLB consistence with a property known as "inclusion". In general, "inclusion" means that any instruction between the output of a component and the retirement unit in the processor will be in the component either as an instruction or a reference to the instruction.

ICACHE inclusion in this context means that the instruction bytes for any instruction between the output of the ICACHE and retirement will be in the ICACHE. ICACHE inclusion is used in Pentium Pro to perform SMC detection of the Pentium Pro pipeline. The physical addresses of all modifications to memory are afforded to the ICACHE 114 by the out of order core unit 118 on the snoop bus 128. If the addresses found the ICACHE, a hit response is returned to the out of order core unit 118 on the hit/miss bus 126. On a hit, the out of order core execution unit 118 and retirement unit 120 are responsible for flushing the modified instructions. The Pentium Pro maintains ICACHE inclusion using a victim cache. The victim cache is expensive in hardware due to the extra hardware and area required for the hardware to implement the victim cache and the associated control logic.

The Pentium Pro also maintained instruction TLB (ITLB) inclusion by using a serialize on replacement scheme to ensure that any address translation for any instruction between the output of the ITLB 112 and the retirement unit 120 will be in the ITLB 112. The "serialize on replacement scheme" involves stopping the ICACHE 114 from providing instructions to the out of order core unit 118 and waiting for the retirement unit 120 to finish retiring all the instructions that remain in the out of order core unit 118. While inexpensive to implement and effective at maintaining ITLB inclusion, the serialize on replacement scheme has detrimental impacts on processor performance.

Therefore, an improved method and system for maintaining a macro instruction in a pipelined processor that provides higher performance, uses less hardware and is less complex than existing methods and systems is needed.

SUMMARY OF THE INVENTION

Embodiments of the present invention provide a method for maintaining an instruction in a pipelined processor using inuse fields. The method involves receiving a read request for an instruction, sending the instruction in response to the read request and setting an inuse field associated with the instruction to inuse.

BRIEF DESCRIPTION OF THE DRAWINGS

The various features of the invention will best be appreciated by simultaneous reference to the description, which follows, and the accompanying drawings, in which.

DETAILED DESCRIPTION

Figure 1:
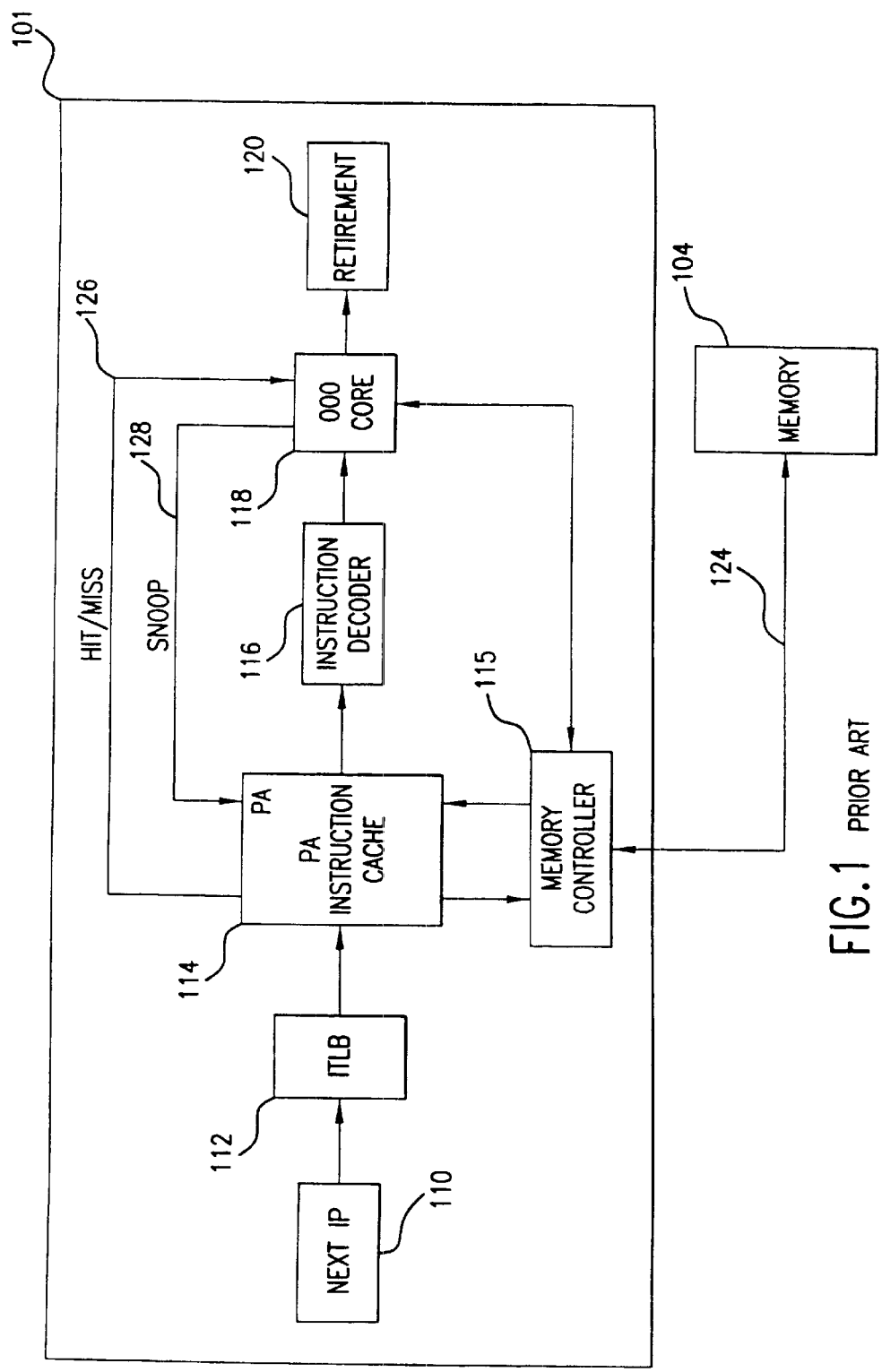
FIG. 1 illustrates a simplified block diagram of a prior art microprocessor coupled to memory in which an embodiment of the present invention is utilized.

Embodiments of the method and system for an INUSE field resource management scheme are described. In the following description, for purposes of explanation, numerous specific details are set forth to provide a thorough understanding of the present invention so that the present invention may be practiced without these specific details. In other instances, well known structures and devices are shown in block diagram form. Furthermore, the specific sequences in which steps are presented and performed are illustrative and it is contemplated that the sequences can be varied and still remain within the spirit and scope of the present invention.

Embodiments of the present invention are described as alternatives to current microprocessor resource management schemes such as the use of the victim cache and serialize on replacement scheme.

In accordance with an embodiment of the present invention, the INUSE field scheme, as applied to caches and TLBs, requires at least one additional state bit per line or entry to indicate that this entry is currently "inuse." As a result, embodiments of the present invention include INUSE field lengths of at least one bit and can, therefore, be alternatively implemented as a single INUSE bit or an INUSE field with a length of more than one bit. In an embodiment of the present invention, multiple bit field lengths can be used to implement partial cache and pipeline flushing as a result of, for example, a mispredicted branch condition. For ease of explanation, the term INUSE field will used herein to refer to both the INUSE field and INUSE bit implementations. Regardless of the specific implementation, as each entry is used, that is, as each entry is read into the pipeline, the INUSE field for the entry is set to inuse.

In accordance with an embodiment of the present invention, each time a cache line is read from the ICACHE, the INUSE field associated with that line is set to inuse. As processing continues, more and more lines in the ICACHE are read by the processor and the INUSE fields associated with each line read are set to inuse. As a result, unless something is done to clear the INUSE fields eventually all the instructions will be marked as inuse and no new entries can be allocated. When this happens, the processor must be drained of all instructions. Once the processor is drained, all the INUSE fields are reset to not in use. Similarly, whenever the processor pipeline is drained, for example, when a branch misprediction occurs, the INUSE fields are also reset to not in use. If the incidental pipeline drains occur often when compared to the time it takes to fill the ICACHE, the INUSE field full case will rarely, if ever occur.

In accordance with an embodiment of the present invention, when an ICACHE miss occurs, that is, when the desired instruction is not in the ICACHE, any instruction in the ICACHE marked as not-inuse can be selected as a victim and removed to make room for the requested instruction. This ensures that no instructions currently in the pipeline are removed. As a result, the INUSE field inclusion scheme is cheaper in hardware than the victim cache and higher in performance than the serialize on any replacement scheme. "Snooping" is the process of reading the contents of either a cache, buffer, register or pipeline to determine which instructions or data are present.

While the above embodiment describes using the INUSE fields in an ICACHE, embodiments are contemplated for using the INUSE fields in an ITLB. In fact, in another embodiment of the present invention INUSE fields are implemented in both the ICACHE and the ITLB. While INUSE fields are only needed in either the ICACHE or the ITLB for SMC, implementing INUSE fields in both the ICACHE and the ITLB permits their use as a resource tracking mechanism to maintain resources.

In accordance with an embodiment of the present invention, a general inuse inclusion algorithm is as follows:

1. Each entry has an associated INUSE state field. Where each entry can be a line, an instruction, a translation, etc.
2. When the entry is used, the entry's associated INUSE state field is set to inuse, for example, in one embodiment the state field is set to a logical one (1) to indicate that the entry is in use.
3. INUSE fields can be cleared when it can be known that entries are not inuse.
4. No entry, which is marked inuse, can be removed.
5. Any entry that is not inuse can be removed.
6. A method is provided to clear the INUSE field when an entry is known to no longer be needed for inclusion such as when the pipeline has been drained or flushed.

In embodiments of the present invention, the entries can be ITLB pages and ICACHE instruction lines.

In some applications, the INUSE fields may not see enough incidental INUSE field clears which can cause performance loss due to INUSE field demand clears. An example of this is when aggressive branch recovery results in the pipeline never fully draining on a mispredicted branch and INUSE field coloring can be used to work around this problem. "Coloring" is a mechanism used in branch recovery in which groups of sequentially associated instructions are "marked" with the same "color". As a result, when the sequentially last instruction in the group completes executing and is retired, the processor knows that all of the other preceding instructions in the group must also have completed executing and be retired. Thus, the INUSE fields for all of the instructions in the group can be reset. This is made possible by the in-order, sequential retirement of instructions in the group even though the actual execution of the instructions may have occurred out-of-order.

FIG. 1 illustrates a block diagram of a prior art microprocessor 101 coupled to a memory 104. A next instruction process (IP) 110, also referred to as instruction sequencer, is a state machine and branch prediction unit that builds the flow of execution microprocessor 101. To support page table virtual memory accesses, the microprocessor 101 includes an instruction translation look aside buffer (ITLB) 112. The ITLB 112 includes page table entries of linear to physical address translations into memory 104. Usually the page table entries represent the most recently used pages a memory 104, which point to a page of memory and instruction cache (ICACHE) 114. Instructions are fetched over the memory bus 124 by the memory controller 115 for memory 104 for storage into the instruction cache 114. The ICACHE 114 is physically addressed. A physical address is the lowest level address translation and points to an actual physical location associated with physical hardware. In contrast, a linear addresses and address associated with a program or other information that does not directly point into a memory, cache memory or other physical hardware. A linear address is linear relative to the program or other information. Copies of instructions within memory 104 are stored the ICACHE 114. Instructions are taken from the ICACHE 114, decoded by the instruction decoder 116 and input into an instruction pipeline (not shown) within the out of order core execution unit 118. Upon completion by the out of order core execution unit 118, an instruction is retired by the retirement unit 120. The retirement unit 120 processes instructions in program order after they have completed execution. Retirement processing includes checking for excepting conditions (such as occurrence of self-modifying code) and committing changes to architectural state. That is, the out of order core execution unit 118 executes instructions which can be completely undone before being output by the microprocessor if some excepting condition has occurred which the retirement unit has recognized.

In "out of order" processors, such as microprocessor 101, the number of instructions in the instruction pipeline are so great that it is impractical to compare all instructions in the pipeline of the microprocessor 101 with all modifications of a program memory to be certain no changes have occurred. To do so would require too much hardware. In the prior art microprocessor 101, this problem solver having all store instructions executed by the out of order execution unit 118, which would execute a store instruction into the memory 104 or into a data cache (not shown) within the execution unit 118, trigger a snoop of the ICACHE 114. Additionally, ICACHE inclusion was provided to assure coherency of the instruction pipeline. ICACHE inclusion means that the instruction bytes for an instruction in the instruction pipeline are guaranteed stay in the ICACHE 114 until the instruction is no longer stored within the instruction pipeline, that is, retired. In this case, if cache coherency is maintained, then pipeline coherency is maintained by the ICACHE inclusion.

Recall that the instruction cache 114 the prior art microprocessor 101 is physically, addressed. Therefore snoops, triggered by store instructions into memory 104, can perform SMC detection by comparing the physical address of all instructions stored within the ICACHE 114 with the address of all instructions stored within the associated page or pages of memory 104. If there is an address match, it indicates that a memory location was modified. In the case of an address match, indicating an SMC condition, the instruction cache 114 and instruction pipeline are flushed by the retirement unit 120 and the new instructions are fetched from memory 104 for storage into the instruction cache 114. The new instructions within the ICACHE 114 are then decoded by the instruction decoder 116 an input into the instruction pipeline within the out of order core execution unit 118.

Figure 2:
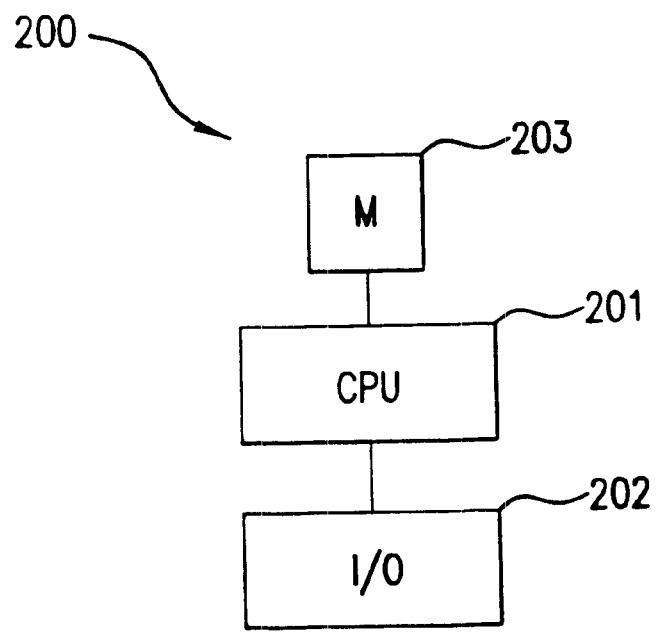
FIG. 2 illustrates a block diagram of a typical computer in which an embodiment of the present invention is utilized.

FIG. 2 illustrates a block diagram of a typical computer in which an embodiment of the present invention is utilized. In FIG. 2, computer 200 includes a central processing unit (CPU) 201 coupled to input/output (I/O) devices 202 (such as, a keyboard, modem, printer, external storage devices and the like) and monitoring devices (M) 203 (such as, a cathode ray tube (CRT) or graphics display).

Figure 3B:
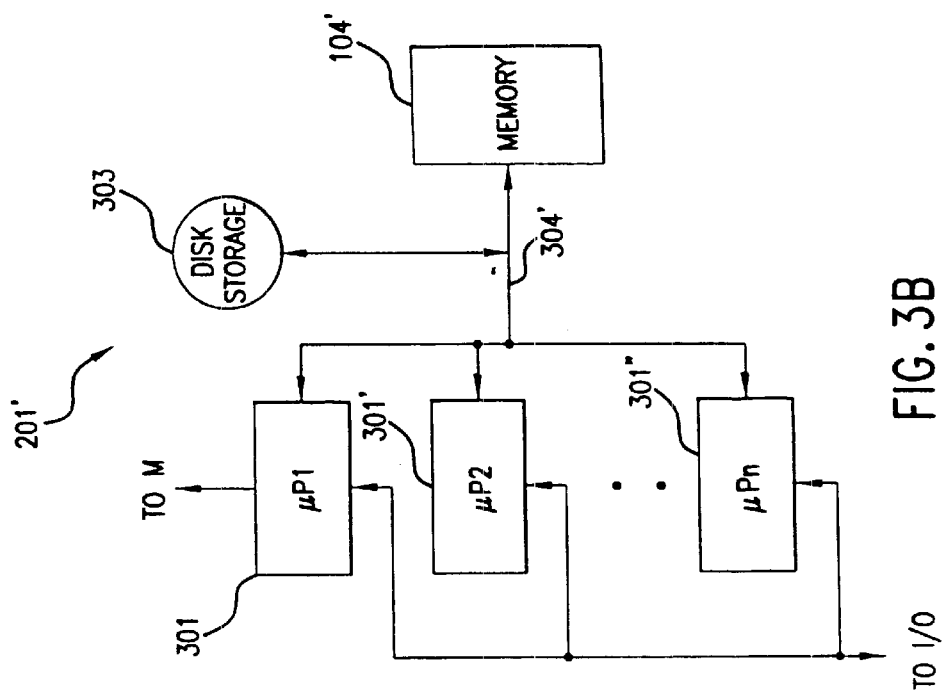
FIG. 3B illustrates a block diagram of a typical multiprocessor central processing unit in which an embodiment of the present invention is utilized.
Figure 3A:
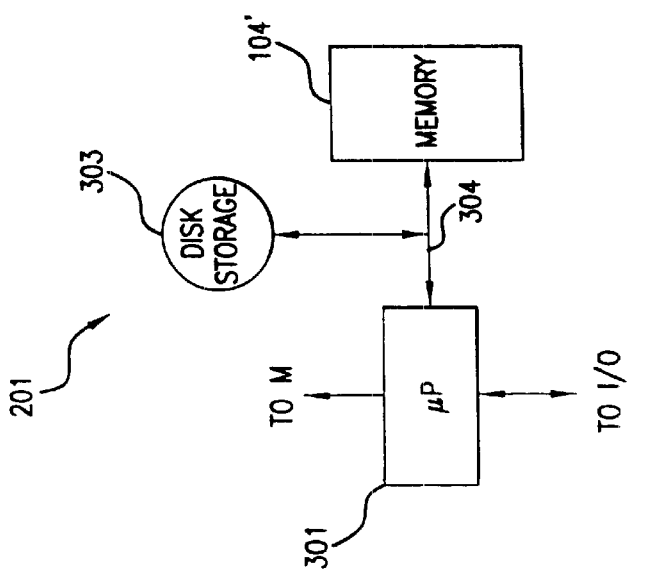
FIG. 3A illustrates a block diagram of a typical central processing unit in which an embodiment of the present invention is utilized.

FIG. 3A illustrates a simplified block diagram of a typical central processing unit in which an embodiment of the present invention is utilized. The central processing unit 201 includes an advanced microprocessor 301 including an embodiment of the present the present invention, a disk storage device 303, and a memory 104' for storing program instructions coupled together. The prime notation used herein with the reference designators indicates blocks having similar functionality with the same reference number; however, the block may be slightly altered to provide support for the advanced microprocessors of the present invention. For example, memory 104' may be considerably larger the memory 104 due to wider data bit width and address space provided by the advanced microprocessor 301. Disk storage device 303 may be a floppy disk, zip disk, DVD disk, hard disk, rewritable optical disk, flash memory or other non-volatile storage device. The advanced microprocessor 301 and the disk storage device 303 can both read and write information in the memory 104' over the memory bus 304. Thus, both the advanced microprocessor 301 and the storage device 303 can alter memory locations within memory 104' during program execution. In order for the disk storage device 303 to do this directly, it includes a disk controller would direst memory access which can perform stores into memory and thereby modify code. Because the controller can directly access the memory it is an example of a direct memory access (DMA) agent. Other devices having direct access to store information into memory are also DMA agents. Memory 104' is typically a dynamic random access memory (DRAM) but may be other types of rewritable storage. Memory may also be referred to herein as program memory because it is utilized store program instructions. Upon initial execution of a program stored in the disk storage device 303 or stored in some other source such as I/O devices 202, the advanced microprocessor 301 reads program instructions stored in the disk storage device 303 or other source and writes them into memory 104'. One or more pages or fractions thereof of the program instructions stored within memory 104' are read (that is, "fetched") by microprocessor 301 for storage into an ICACHE (not shown). Some of the program instructions stored in the instruction cache may be read into an instruction pipeline (not shown) for execution by the advanced microprocessor 301.

FIG. 3B illustrates a block diagram of a multiprocessor central processing unit in 201' in which the present invention is utilized. The central processing unit 201' includes multiple (N) advanced microprocessors 301 including the present invention labeled as microprocessors 301 through 301"; the disk storage device 303; and memory 104' coupled together is illustrated in FIG. 3B. The N advanced microprocessors 301 through 301" and the disk storage device 303 can both read and write information into memory 104' over the memory bus 304'. That is memory 104' shared by the N microprocessors 301 through 301". Any one of the N microprocessors 301 through 301" or the disk storage device 303 can alter memory locations within memory 104' during program execution. In order for the disk storage device 303 to do this directly, it includes a disk controller with direct memory access, which can perform stores in the memory and thereby modify code. Because the controller can directly access the memory it is an example of a DMA agent. Other devices having direct access to store with information into memory are also DMA agents. The present invention in each of the advanced microprocessors 301 through 301" maintains cache coherency and pipeline coherency in a shared memory multiprocessor system.

Figure 4A:
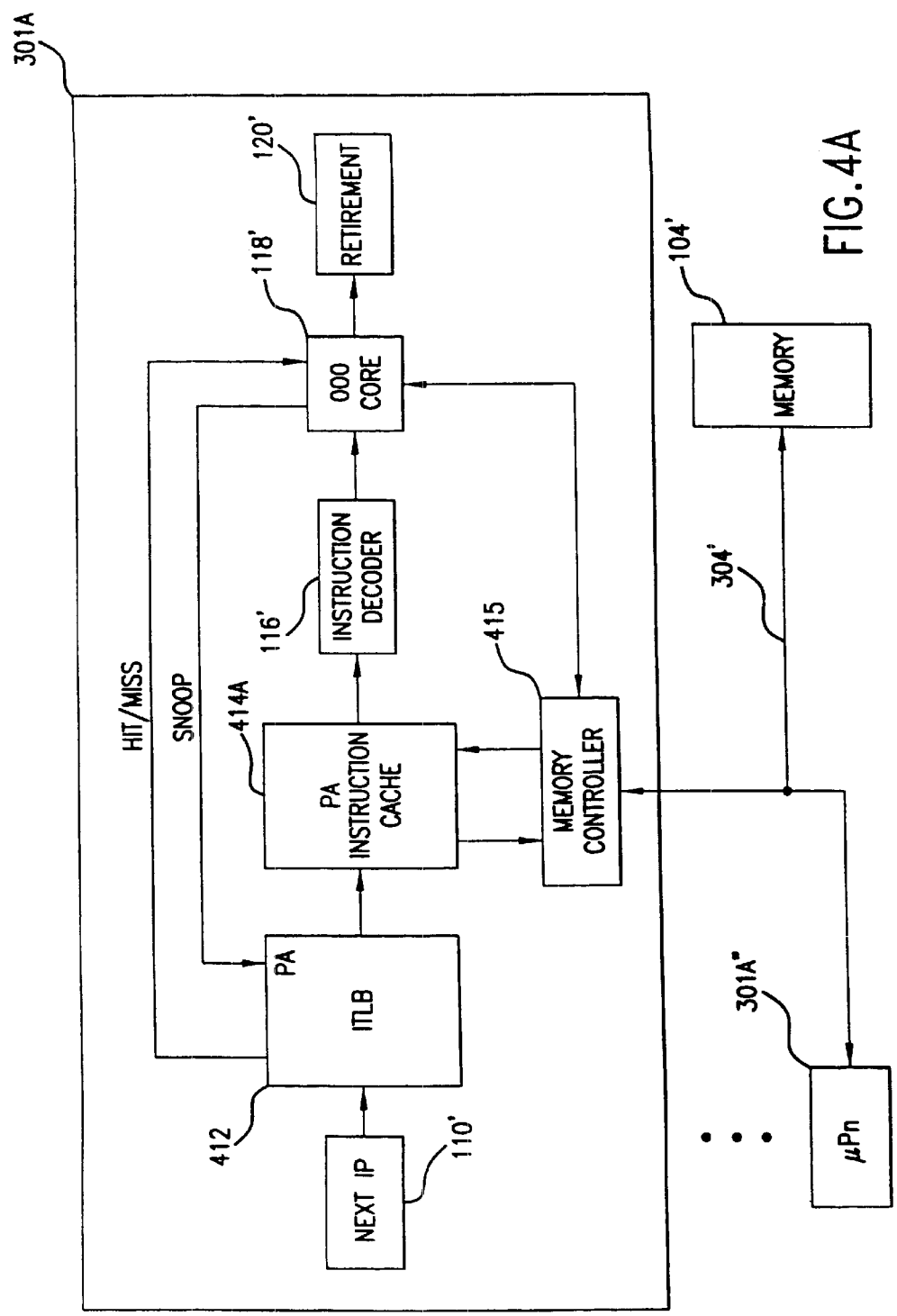
FIG. 4A illustrates a block diagram of microprocessors in a multiprocessor system coupled to a memory in which an embodiment of the present invention is utilized.

FIG. 4A illustrates a block diagram of microprocessors 301A through 301A" in a multiprocessor system, including an embodiment of the present invention, coupled to the memory 104'. Microprocessor 301A, as well as the other microprocessors of the multiprocessor system, includes a next instruction processor (IP) 110', an instruction translation look aside buffer (ITLB) 412, an instruction cache (ICACHE) 414A, a memory controller 415, an instruction decoder 116' an out of order core execution unit 118' and a retirement unit 120'. In the advanced microprocessor 301, instructions can be stored in instruction storage elements (for example registers, buffers, etc.) from the ITLB 412 to the retirement unit 120'. These instruction storage elements within the instruction decoder 116', out of order core execution unit 118', the retirement unit 120', and other instruction storage elements are considered to be the instruction pipeline of the advanced microprocessor 301A. The instruction pipeline needs to be coherent (pipeline coherency) as does the ICACHE 414A (cache coherency). Generally, the instruction decoder 116' accepts an instruction or operation as an input, decodes the instruction, and performs the instruction processing needed to form the instruction in into a micro-operand (UOP) which is understandable and can be executed by the out of order core execution unit 118'. In an embodiment of the present invention, the instruction or operations are IA-32 instructions, which are backward compatible with software and decoded into UOPs which can be executed by the out of order execution unit 118'. The IA-32 instructions run on the Intel Corporation 80×86 family of processors and above, for example, an 80836 and Pentium family processors.

In an embodiment of present invention, ICACHE 414A is a physically addressable ICACHE containing physical addresses, which can be used for snoops. However, in this case snoops for determining cache coherency and pipeline coherency are preferably performed using the ITLB 412 instead of the physically addressable ICACHE 414A in order to avoid complications of arbitration or dual porting of the ICACHE 414A. "Dual porting" of the ICACHE 414A is shown in FIG. 1 by the coupling of the snoop bus 128 and the hit/miss bus 126 to the ICACHE 414A.

Returning now to FIG. 4A, ICACHE 414 any may include instructions that can be used by the out of order core execution unit 118' to execute some function or process. If the out of order execution unit 118' requires an instruction not within the instruction cache 414A, a miss has occurred and the instruction needs to be fetched from memory 104'. Memory controller 415 ordinarily interfaces to the ICACHE 414A in order store instructions therein. In the case of a miss, memory controller 415 fetches the desired instruction from memory 104' and provides it to both the out of order core execution unit 118' and the ICACHE 414A.

Memory controller 415 additionally monitors the memory bus 304' to detect when a store has occurred into the memory 104' and reads the physical address of the store. In this manner when some external device such as a DMA agent (such as, disk storage device 303) or a different microprocessor (such as 301A") alters a memory location within memory 104', memory controller 415 triggers a snoop. In an embodiment of the present invention the memory controller 415 communicates to the out of order core execution unit 118' that a store into memory has occurred in conjunction with the physical address in order to trigger the snoop. The out of order core execution unit 118' processes this information and causes the ITLB 412 to perform snoop using the physical address read from the bus. In other embodiments the memory controller 415 may directly communicate to the ITLB 412 to perform a snoop using the physical address read from the bus. In other embodiments the memory controller 415 may directly communicate to the ITLB 412 to execute a snoop in the physical address of the store. Each microprocessor 301 through 301" of the multiprocessor system 201' operates in this fashion to determine if a snoop needs to be triggered due to some external occurrence or state change. If the out of order core execution unit 118' itself performs a store into memory 104', it directly informs the ITLB 412 to perform a snoop and passes physical address of the store.

The ITLB 412 contains page table address translations from linear to physical addresses into memory 104'. These page table address translations maintain an inclusion with all instructions in the instruction cache and the instruction pipeline. "Inclusion" meaning that any byte that went into making any instruction has its original translation within the ITLB 412. Generally, the ITLB 412 accepts an input linear address the returns a physical address associated with the location of instructions within memory 104'. Because the ITLB has the physical page addresses and inclusion is provided, it can be used to perform snoops for SMC detection and maintain cache coherency and pipeline coherency. Because snoops for SMC detection are physical and the ITLB 412 ordinarily accepts as an input a linear address to translate into a physical address, the ITLB 412 is additionally formed as a content addressable memory (CAM) on the physical addresses. The ITLB 412 also includes an additional input comparison port (referred to as a snoop port or reverse translation port) to perform content addressing of physical addresses stored therein. When a snoop is triggered, the physical address of the store into memory is provided to the snoop port and the ITLB performs a comparison with all the physical page addresses located within the ITLB 412 to determine whether a store into memory has addressed a page which may be stored in the instruction cache 414A. If a match is found, a store occurred into the memory 104' within a page of instructions the may be stored within an instruction cache and the cache and the instruction pipeline may be incoherent with memory. Searching the CAM within the ITLB 412 using the physical address as a key is a fast way to provide SMC detection and determine possible cache incoherence. This process of providing a physical address to determine if a match exists with a physical address stored in the ITLB 412, is referred to as a reverse translation. The ITLB 412 having the CAM to provide this comparison of physical addresses may also be referred to as a reverse translation look-aside buffer. By moving SMC detection to the ITLB 412 in the present invention, a snoop port need not be included in the ICACHE 414A and, thus, the ICACHE 414A can be considerably simpler with smaller physical dimensions while providing the same number of bytes of storage locations.

The ITLB 412 furthermore provides inclusion for both the instruction pipeline as well as the ICACHE 414A. Inclusion provided by the ITLB may be referred to as ITLB inclusion. Inclusion provided by the ITLB means that instruction bytes for any instruction in the instruction pipeline or the ICACHE 414A are guaranteed to have their respective original page translation stay in the ITLB 412 until the associated instructions are no longer stored within the instruction pipeline, (that is, retired) and are no longer stored in the ICACHE 414A. For the ITLB 412 to provide inclusion, each page translation includes an INUSE field upon which an INUSE state algorithm is used to set or clear the INUSE field. The following INUSE state algorithm is used to provide ITLB inclusion. For each instruction fetch that requires a page translation, the ITLB entry used to perform the translation is marked inuse using the INUSE field. Since instruction bytes in the instruction cache and instruction pipeline must have been originally fetched using the ITLB and, as long as no page translations are replaced that are marked inuse, each instruction byte in the instruction cache and instruction pipeline will be guarded by the INUSE field entries. Replacement means writing over a page translation with a new page translation.

As time goes by, more and more entries will get marked inuse. Unless something is done to clear the INUSE fields, eventually all entries will be marked inuse and no new entries can be allocated. When this happens, the microprocessor must be drained of all instructions (that is, all executed to completion) and the ICACHE 414A flushed (that is, all cache lines invalidated). Once the processor is drained and the instruction cache flushed, all of the INUSE fields in the ITLB can be reset indicating a not INUSE state for each page translation. In addition, the INUSE fields can be reset anytime the instruction pipeline is drained and the instruction cache is flushed for another reason, such as a process switch. In another embodiment, selective invalidation of cache lines can be performed when a page translation with a set INUSE field entry is replaced When a miss occurs in the ITLB, that is no page translation exists within the ITLB, any not inuse page translation entry may be selected for replacement since only entries with the INUSE field set can have instructions in the pipeline. Generally, the inuse inclusion algorithm provides: 1. Each element has an INUSE state (the INUSE field). 2. When an element is used, it is marked inuse. 3. All INUSE fields can be cleared when it is known that all elements are not inuse. 4. No element, which is marked inuse, can be replaced. Any element that is not inuse can be replaced.

Figure 4B:
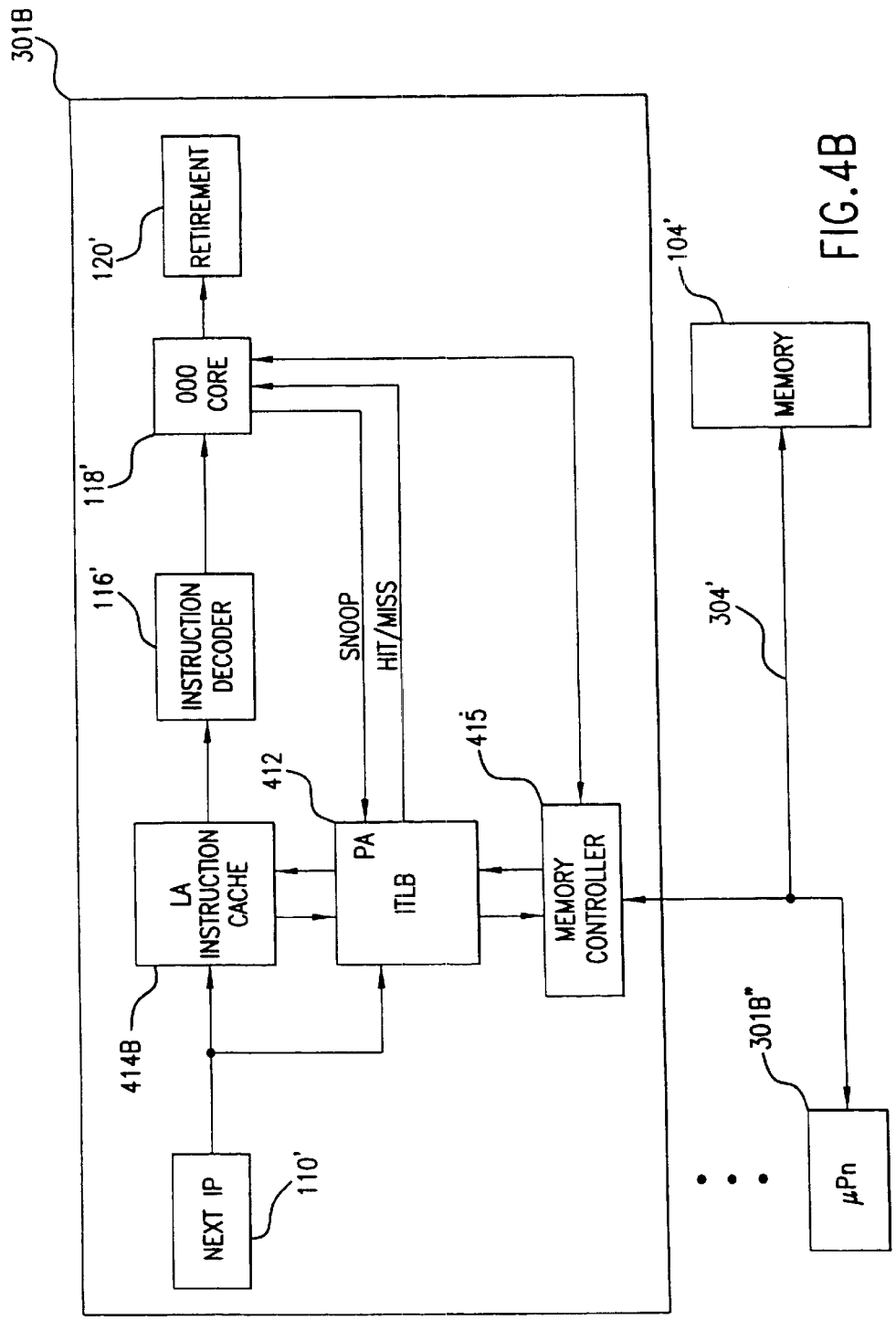
FIG. 4B illustrates a block diagram of a plurality of microprocessors in a multiprocessor system coupled to a memory in which an embodiment of the present invention is utilized.

FIG. 4B illustrates a block diagram of a plurality of microprocessors in a multiprocessor system coupled to a memory in which an embodiment of present invention is utilized. In FIG. 4B, a plurality of microprocessors 301B through 301B" in a multiprocessor system are coupled to the memory 104'. Elements of the microprocessor 301B, are contained in the other microprocessors of the multiprocessor system. In FIG. 4B, the physically addressed instruction cache 414A is replaced with a linearly addressed instruction cache 414B. Other elements of this embodiment being similar to the embodiment in FIG. 4A are functionally equivalent. Return to FIG. 4B, because instruction cache 414B contains no physical addresses, the snoops performed to maintain cache and pipeline coherency need to be performed by the ITLB 412 which contains physical addresses. The next IP 110' provides a linear address to both the linear address ICACHE 414B and the ITLB 412. Memory controller 415 detects external stores into the memory 104'. Upon detecting an external store into the memory 104', the memory controller 415 communicates to the out of order core execution unit 118' that a store into the memory 104' has occurred in conjunction with the physical address in order to trigger the snoop. Upon the out of order core execution unit 118' receiving the signal from the memory controller 415 that a store into memory 104' occurred with the physical address, the snoop is triggered and the out of order core execution unit 118' provides the physical address to the ITLB 412. If the out of order core execution unit 118' itself performed the store the memory 104', the out of order core execution unit 118' directly informs the ITLB 412 to perform a snoop and passes the physical address of the store to the ITLB 412.

Figure 4C:
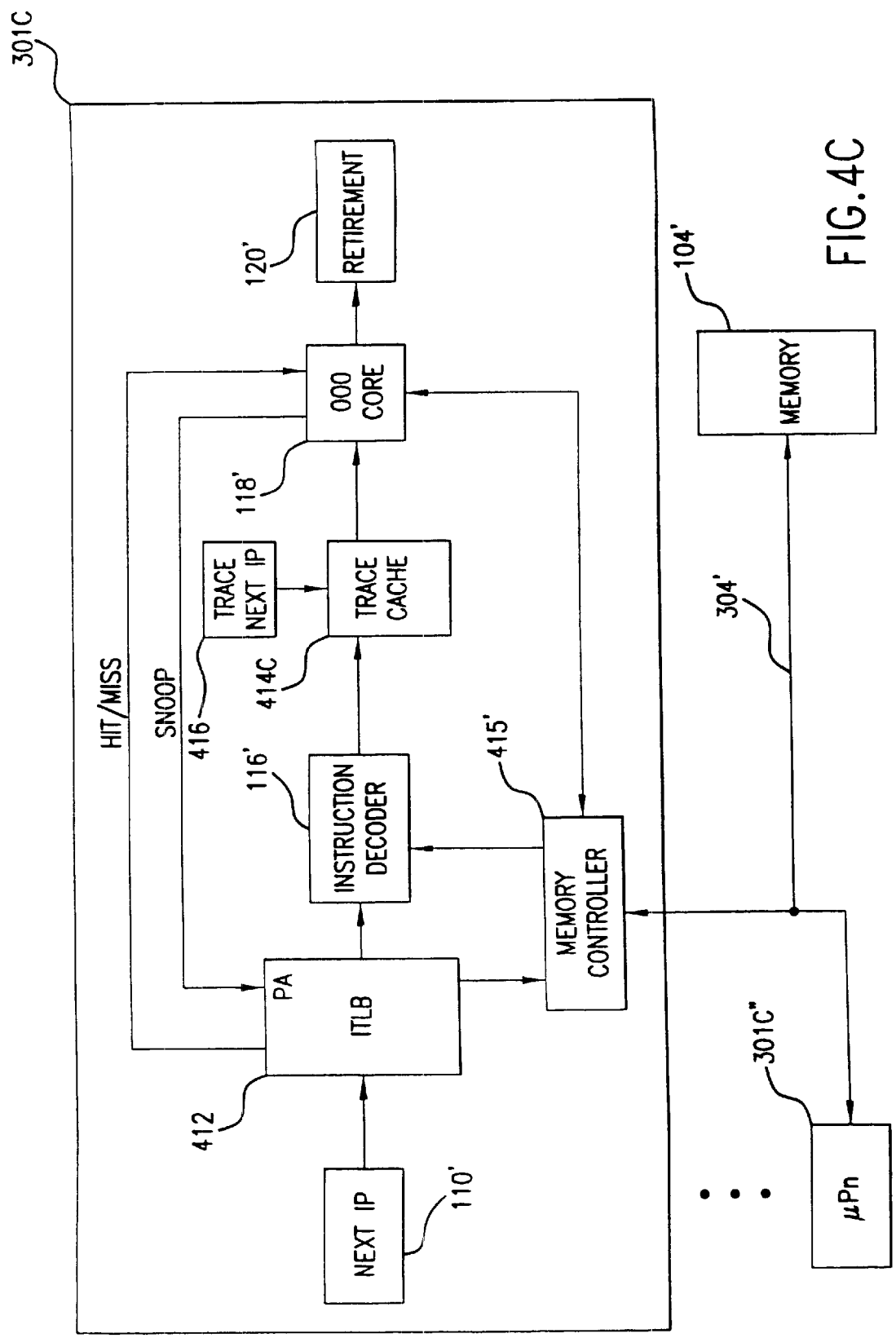
FIG. 4C illustrates a block diagram of microprocessors in a multiprocessor system coupled to a memory in which another embodiment of the present invention is utilized.

If it is determined by the ITLB 412 the physical address of the store into memory is associated with a page translation contained therein, an SMC hit is signaled to the out of work or execution unit 118' signaling the instruction was possibly altered on a page stored within the ICACHE 414B and/or the instruction pipeline. An advantage of the linear address ICACHE 414B is that latency of the instruction pipeline can be reduced FIG. 4C illustrates a block diagram of N microprocessors 301C through 301C" in a multiprocessor system, including an embodiment of the present invention, are coupled to memory 104'. Microprocessor 301C, as well as the other microprocessors of the multiprocessor system, includes a next IP 110', a ITLB 412, an instruction decoder 116', a trace cache 414C, a trace next instruction processor (IP) 416, a memory controller 415', an out of order core execution unit 118' and a retirement unit 120'. The instruction storage elements within the instruction decoder 116', the trace cache 414C, out of order core execution unit 118', the retirement unit 120', and other instruction storage elements are considered to be the instruction pipeline of the microprocessor. Because the advanced microprocessor 301C employs a trace cache 414C which differs from other instruction caches, prior art SMC detection methods, such as ICACHE snooping cannot be used. The trace instruction cache 414C can store multiple sequences or traces of instructions for different programs in order to provide higher bandwidth and lower latency. In the trace cache 414C, only the first instruction of the series of instructions for program (a "trace") has an address associated with it. A sequence of related instructions stored within the trace cache 414C are oftentimes referred to as a "trace" of instructions. The other instructions that follow the first instruction are simply stored within the trace cache 414C without associated external address. An advantage to using the trace cache 414C, is that the latency is further reduced over that of the linearly addressed ICACHE 414B in FIG. 4B and the bandwidth is increased.

Returning to FIG. 4C, instructions are stored in UOP form in the trace cache 414C after being decoded by the instruction decoder 116'. Memory controller 415' interfaces to the ITLB 412 and the instruction decoder 116' in order the store instructions in their UOP form into the trace cache 414C. In the case of a miss, memory controller 415' fetches the desired instruction from memory 104' and provides it to the instruction decoder 116'. Memory controller 415' otherwise functions as the memory controller 415 described above in reference to FIG. 4A and, returning to FIG. 4B, monitors the memory bus 304' to detect when a store has occurred into the memory 104' in order to trigger a snoop using the physical address of the store. If the out of order core execution unit 118' itself performed the store the memory 104', the out of order core execution unit 118' directly informs the ITLB 412 to perform a snoop and passes the physical address of the store to the ITLB 412.

In the trace cache 414C only the first instruction has a linear address associated with it. For this reason the trace cache 414C is referred to as being linearly addressed as opposed too physically addressed. Because only the first instruction is linearly addressed and subsequent instructions are not externally addressable, the trace cache 414C is also referred to as being sparsely addressable. The trace cache 414C is linearly addressed only to the first instruction of a trace. Subsequent instructions within a trace are addressed by the control flow of the trace cache 414C and are not externally addressable. Because the trace cache 414C is linearly and sparsely addressed, snoops that perform physical address comparisons when triggered by stores in the memory are not usable because of the lack of physical addresses in the trace cache 414C. Similarly, because the trace cache 414C is only linearly addressed by the first instruction in a trace of instructions, subsequent instructions are not externally addressable to perform comparisons. Thus, the trace cache 414C is not suited for performing SMC detection.

Because no physical addresses are employed within the trace cache 414C, it is necessary to snoop using the physical addresses within the ITLB 412 to detect self modifying code. Memory controller 415 detects external stores into memory. Upon detecting an external store into memory, the memory controller 415 communicates to the out of order core execution unit 118' receiving the signal from the memory controller 415 that a store into memory 104' is being executed, a snoop is triggered where the physical address of the memory location where the store occurred is provided to the ITLB 412 to perform comparisons with physical addresses contained therein. If the out of order core execution unit 118' itself performs a store into memory 104', it directly informs the ITLB 412 to perform a snoop and passes the physical address of the store. If it is determined that the physical address of the store into memory is located on a page which has a page translation stored within the ITLB 412, it is possible that an SMC has occurred for a decoded instruction which was stored within the trace cache 414C and/or instruction pipeline. In this case, an SMC hit signal is provided to the out of order core execution 118' indicating a possible cache incoherence condition. This causes the trace instruction cache 414C and the instruction pipeline within the out of order core execution unit 118' to be flushed by invalidating instructions (instructions ignored or disregarded and overwritten).

Similar to FIG. 4B, the INUSE field may only be implemented in the ITLB 412 since the trace cache 414C can not be physically addressed and does not contain the necessary hardware and control logic to enable searching the INUSE field in the trace cache 414C.

Figure 5:
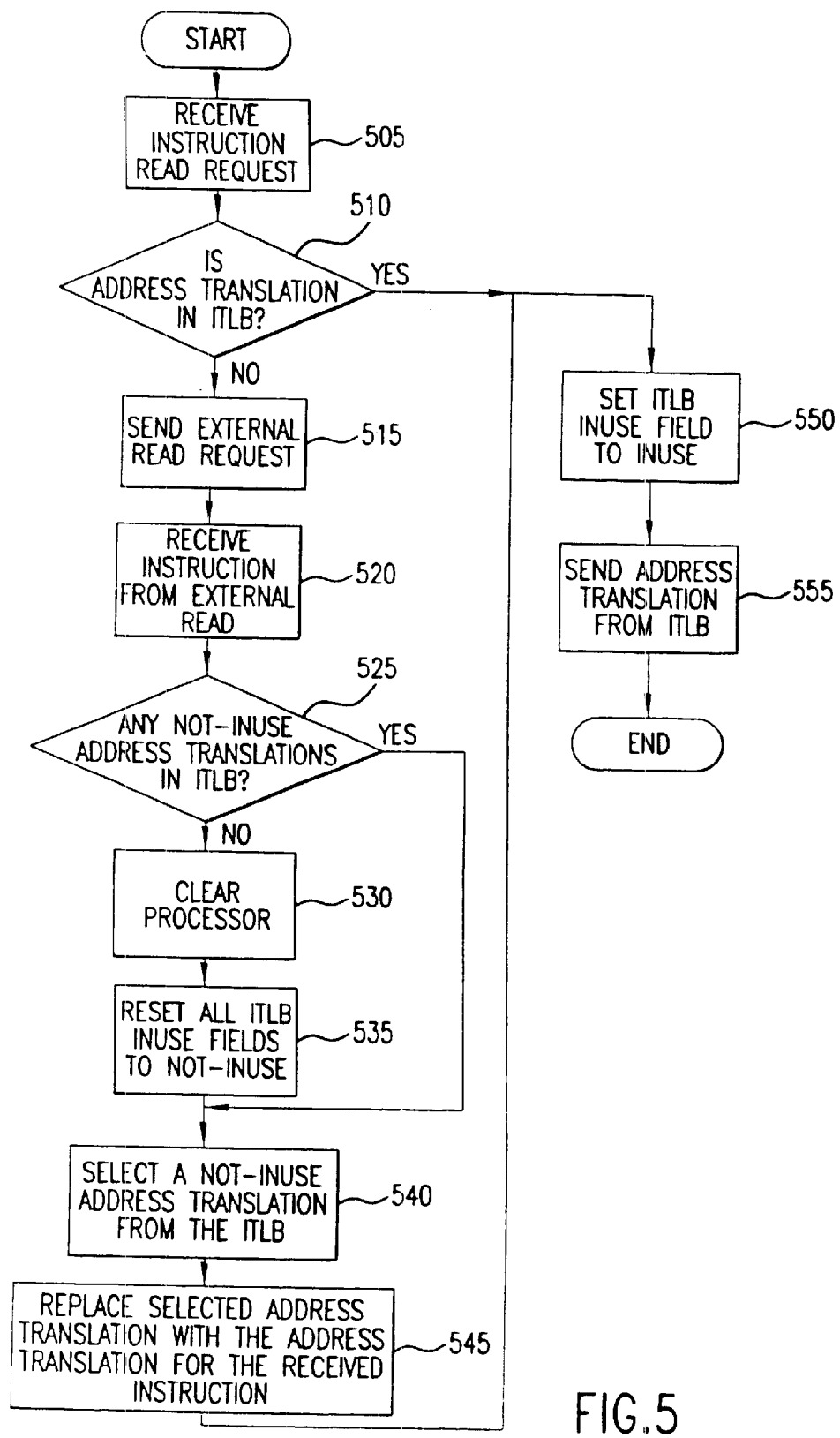
FIG. 5 illustrates a flow diagram of an embodiment of the present invention of the method for maintaining an instruction in a processor using INUSE fields in the ITLB.

FIG. 5, is a block diagram of an embodiment of the method for maintaining an instruction in a processor in accordance with the present invention. In FIG. 5, in block 505 a request for an instruction is received from the processor. In block 510 a determination is made as to whether an address translation for the instruction is located in the ITLB. If the address translation for the instruction is located in the ITLB in block 510, then in block 550 the INUSE field associated with the address translation found in block 510 is set to inuse. By marking the address translation as inuse, the translation is protected from being replaced while the instruction is in the pipeline or cache. This ensures both pipeline and cache inclusion. Then, in block 555 the instruction is sent from the cache to the processor for execution in the pipeline based on the address translation in the ITLB found in block 510 and processing terminates. Embodiments of the present invention are contemplated in which the cache can be implemented as a physically addressed ICACHE, a linearly addressed ICACHE, and a trace cache.

If, in block 510, the address translation is not in the ITLB, then in block 515 either the ITLB or ICACHE sends an external read request for the address translation. In block 520, the address translation is received in response to the external read request. In block 525 a determination is made on whether there are any not-inuse address translations in the ITLB by performing a search of the ITLB to find any address translations without the INUSE field set. If, in block 525, any address translations without the INUSE field set are found, then in block 540 one of the found not-inuse address translations is selected. Then, in block 545, the new address translation is read into the ITLB in place of a victim instruction specified by the selected address translation and processing continues with block 550, as described above. If in block 525 all of the INUSE fields are set to inuse, then in block 530 the processor is stopped from receiving any additional instructions into the pipeline and the processor is serialized to guarantee that no instructions remain in the pipeline. In another embodiment of the present invention, the processor can be stopped and all instructions flushed rather than serialized. Then in block 535 all of the INUSE fields associated with the address translations in the ITLB are reset to not-inuse since no ITLB entries are guarding any active instructions in the ICACHE or pipeline and processing continues in block 540 as described.

In an embodiment of the present invention, the ITLB is implemented as twice the size of previous ITLBs and, as a result, the ITLB rarely has to be dumped due to all of the address translations being inuse when a new request needs to be read into the ITLB. Likewise, the operating system already automatically flushes completed processes.

Figure 6:
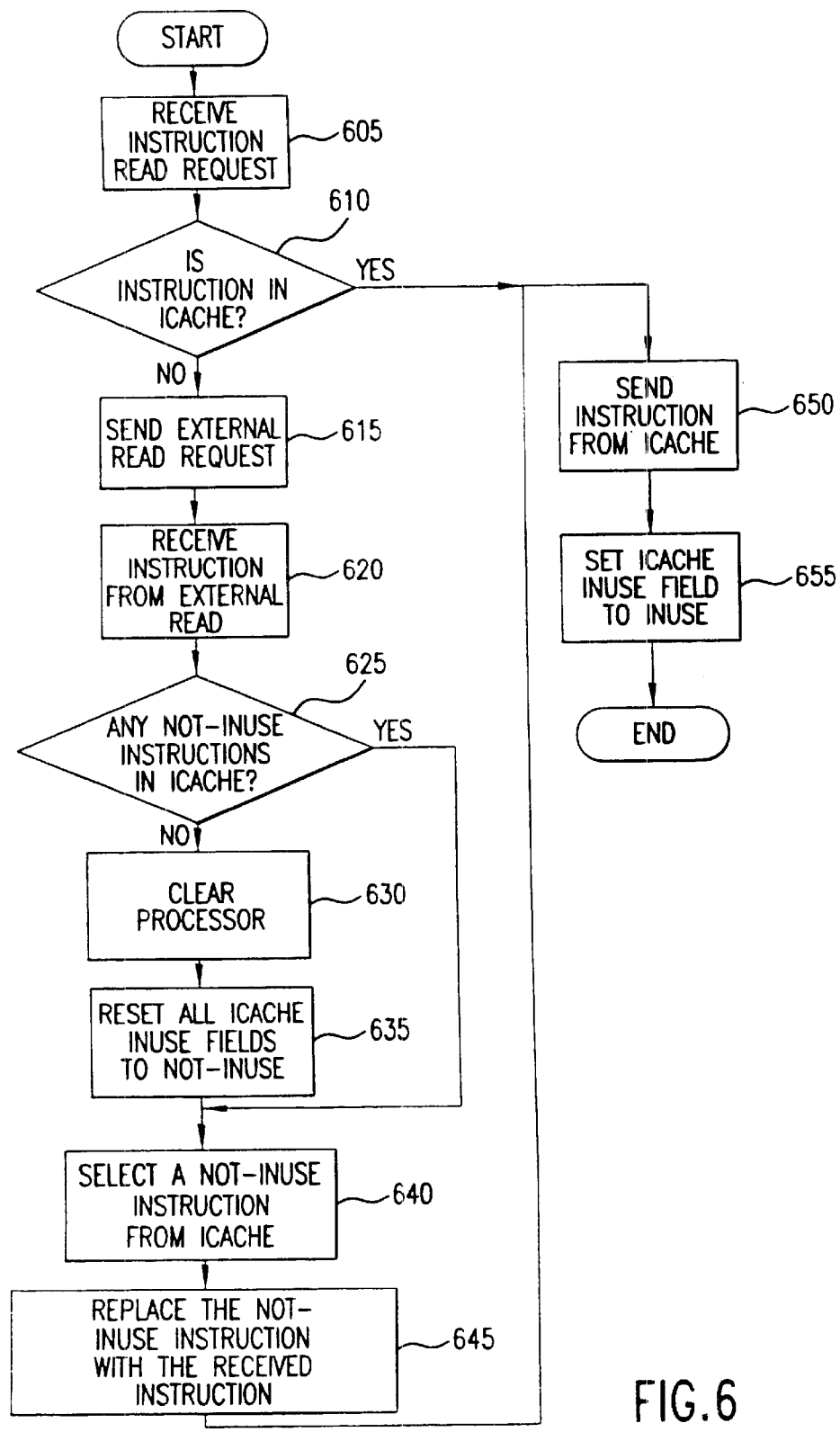
FIG. 6 illustrates a flow diagram of another embodiment of the present invention of the method for maintaining an instruction in a processor using INUSE fields in the ICACHE.

FIG. 6, is a block diagram of an embodiment of a method for maintaining an instruction in a processor in accordance with the present invention. In FIG. 6, in block 605 a request for an instruction is received from the processor. In block 610 a determination is made as to whether the instruction is located in the ICACHE. If the instruction is located in the ICACHE in block 610, then in block 650 the instruction is sent from the ICACHE. Then, in block 655, the INUSE field associated with the instruction in the ICACHE is marked as inuse and processing terminates. By marking the instruction as inuse, the instruction is protected from being replaced while in the pipeline or ICACHE. While this method ensures ICACHE inclusion, the method does not ensure ITLB inclusion.

If, in block 610, the instruction is not in the ICACHE, then in block 615 the ICACHE sends an external read request for the instruction. In block 620, the ICACHE receives the instruction in response to the external read request. In block 625 a determination is made on whether there are any not-inuse instructions in the ICACHE by searching the ICACHE to pick a victim to be replaced by finding an instruction without the INUSE field set. If, in block 625, a not-inuse instruction is found, then in block 640 one of the found not-inuse address translations is selected. Then, in block 645 the new instruction is read into the ICACHE in place of the victim and processing continues with block 650, as described above. If in block 625 all of the INUSE fields are set to inuse, then in block 630 the processor is stopped from receiving any additional instructions into the pipeline and the processor is serialized to guarantee that no instructions remain in the pipeline. In another embodiment of the present invention, the processor can be stopped and all instructions flushed rather than serialized. Then, in block 635 all of the INUSE fields associated with the instructions in the ICACHE are reset to not-inuse since no ICACHE entries are active instructions in the ICACHE or pipeline and processing continues with block 640, as described above.

In another embodiment of the present invention, the method uses coloring for mispredicted branch recovery to prevent the pipeline from never going empty as a result of the aggressive branch recovery working to prevent the pipeline from becoming empty. In this embodiment, colors are assigned to a sequence of instructions as they enter the processor and the instructions must leave in the order they arrived. The color that is assigned to incoming instructions changes on every branch misprediction. As a result, when the last instruction in the color sequence exits the pipeline the method knows that all previous instructions in the color sequence are gone and the INUSE fields associated with these instructions can be reset to not-inuse. The size of the INUSE field and, thus the number of colors, can be determined by whichever number of groupings that are to be tracked. For example, these groupings can be delineated based on branch mispredictions or on an arbitrary basis. In an embodiment of the present invention, the INUSE field is implemented as a two-bit field associated either with each page table in the TLB or with each line in the cache. Each individual bit in the INUSE field is referred to as an INUSE bit. Regardless of the number of INUSE bits used to represent the INUSE field, zero, one or all of the INUSE bits can be individually or concurrently set to on or off to indicate the inuse state of the page or line. For example, in the two bit embodiment, if either or both bits are set to on (that is, set to a logical one) then the page or line is inuse and if both of the two bits are off (that is, set to a logical zero) then the page or line is not-inuse. The inuse state may be checked by outputting each of the INUSE bits to an OR gate logic structure, such that if at least one of the INUSE bits is inuse the output of the OR gate will output a logical one to indicate the page or line is inuse. Similarly, if the output of the OR gate is a logical zero, then the page or line is not inuse.

It should, of course, be understood that while the present invention has been described mainly in terms of ITLB implemented solutions, those skilled in the art will recognize that the principles of the invention may be used advantageously with alternative embodiments involving data caches, data TLBs and write buffers as well. Accordingly, all such implementations, which fall within the spirit and the broad scope of the appended claims, will be embraced by the principles of the present invention.

What is claimed is:

1. A method comprising:
    receiving a read request for an object;
    sending the object in response to the read request;
    setting an inuse field associated with a storage location for the object to indicate the object is in use; and
    said sending the object in response to the read request comprising:
        determining whether the object is in a first memory;
        if the object is not in the first memory, then:
            transmitting an external read request for the object;
            receiving the object in response to the external read request;
            determining whether there are any objects in the first memory that are not in use;
            if none of the objects in the first memory are not in use, then:
                clearing the pipelined processor; and
                resetting all inuse fields to indicate the objects are not in use;
            selecting an object in the first memory that is not in use;
            replacing the selected, not in use object with the object; and
            sending the object from the first memory.

2. The method of claim 1, wherein said sending the object in response to the read request further comprises:
    sending the object from the memory, if the object is in the first memory.

3. The method of claim 1, wherein said clearing the pipelined processor comprises:
    emptying all objects that are protected by inclusion in the pipelined processor.

4. The method of claim 1, wherein said determining whether there are any objects in the first memory that are not in use comprises:
    searching the first memory for an object that is not in use.

5. The method of claim 1, wherein said determining whether the object is in a first memory comprises:
    comparing the object from the read request against all of the objects in the first memory;
    determining the object is in the first memory, if the object from the read request matches any of the objects in the first memory; and
    determining the object is not in the first memory, if the object from the read request does not match any of the objects in the first memory.

6. A machine-readable medium having stored thereon a set of instructions, said instructions being executable by a machine to perform a method comprising:
    receiving a read request for an object;
    sending the object in response to the read request;
    setting an inuse field associated with a storage location for the object to indicate the object is in use,
    said sending the object in response to the read request comprising:
        determining whether the object is in a first memory;
        if the object is not in the first memory, then:
            transmitting an external read request for the object;
            receiving the object in response to the external read request;
            determining whether there are any objects in the first memory that are not in use;
            if none of the objects in the first memory are not in use, then:
                clearing a pipelined processor: and
                resetting all inuse fields to indicate the objects are not in use;
            selecting an object in the first memory that is not in use;
            replacing the selected, not in use object with the object; and
            sending the object from the first memory.

7. The machine-readable medium of claim 6, wherein said sending the object in response to the read request further comprises:
    sending the object from the first memory, if the object is in the first memory.

8. A method comprising:
    receiving a read request for an instruction;
    setting an inuse field to indicate the instruction is in use in an instruction translation look aside buffer (ITLB), said inuse field being associated with an address translation for the instruction;
    sending the address translation from the ITLB in response to the read request; and
    said setting the inuse field to indicate the instruction is inuse in the ITLB comprising:
        determining whether the address translation is in the ITLB;
        if the address translation is not in the ITLB, then:
            transmitting an external read request for the instruction;
            receiving the instruction in response to the external read request;

determining whether there are any address translations in the ITLB that are not in use;
if there are no address translations in the ITLB that are not in use, then:
  clearing a pipelined processor; and
  resetting all ITLB inuse fields to indicate the address instructions are not in use;
selecting an address translation from the ITLB that is not in use;
replacing the selected address translation that is not in use with the address translation for the instruction; and
setting the inuse field associated with the address translation for the instruction to indicate the address translation is in use.

9. The method of claim 8, wherein said setting an inuse field to indicate the instruction is in use in the ITLB comprises:
setting the inuse field associated with the address translation to indicate the address translation is in use, if the address translation is in the ITLB.

10. The method of claim 8, wherein said determining whether there are any address translations in the ITLB that are not in use comprises:
searching the ITLB for an address translation that is not in use.

11. The method of claim 9, wherein said determining whether the address translation is in the ITLB comprises:
comparing the address for the instruction from the read request with the address translations in the ITLB;
determining that the address translation is in the ITLB, if the address translation for the instruction from the read request matches any of the address translations in the ITLB; and
determining that the address translation is not in the ITLB, if the address translation for the instruction from the read request does not match any of the address translations in the ITLB.

12. A machine-readable medium having stored thereon a set of instructions, said instructions being executable by a machine to perform a method comprising:
receiving a read request for an instruction;
setting an inuse field to indicate the instruction is in use in an instruction translation look aside buffer (ITLB), said inuse field being associated with an address translation for the instruction;
sending the address translation from the ITLB in response to the read request; and
said setting the inuse field to indicate the instruction is in use in the ITLB comprising:
  determining whether the address translation is in the ITLB;
  if the address translation is not in the ITLB, then:
    transmitting an external read request for the instruction;
    receiving the instruction in response to the external read request;
    determining whether there are any address translations that are not in use in the ITLB;
    if there are no address translations in the ITLB that are not in use, then:
      clearing the pipelined processor; and
      resetting all ITLB inuse fields to indicate the address translations are not in use;
    selecting an address translation from the ITLB that is not in use;
    replacing the selected address translation that is not in use with the address translation for the instruction; and
    setting the inuse field associated with the address translation for the instruction to indicate the address translation is in use.

13. The machine-readable medium of claim 12, wherein said setting an inuse field to indicate the instruction is in use in the ITLB further comprises:
setting the inuse field associated with the address translation to indicate the instruction is in use, if the address translation is in the ITLB.

14. A method comprising:
receiving a read request for an instruction;
sending the instruction in response to the read request;
setting an inuse field to indicate the instruction is in use, said inuse field being associated with the instruction in an instruction cache (ICACHE); and
said sending the instruction in response to the read request comprising:
  determining whether the instruction is in the ICACHE;
  if the instruction is not in the ICACHE, then:
    transmitting an external read request for the instruction;
    receiving the instruction in response to the external read request;
    determining whether there are any instructions in the ICACHE that are not in use;
    if there are no instructions in the ICACHE that are not in use, then:
      clearing a pipelined processor;
      resetting all ICACHE inuse fields to indicate the instructions are not in use;
    selecting an instruction from the ICAHE that is not in use;
    replacing the selected instruction from the ICACHE that is not in use with the instruction; and
    sending the instruction from the ICACHE.

15. The method of claim 14, wherein said sending the instruction in response to the read request further comprises:
sending the instruction from the ICACHE, if the instruction is in the ICACHE.

16. A computer system comprising:
a pipelined processing unit comprising an instruction cache (ICACHE) and an instruction translation look-aside buffer (ITLB);
a memory unit coupled to said processing unit, said memory unit having stored thereon computer-executable instructions; and
a cache control protocol to control the use of the ICACHE and the ITLB, said cache control protocol being able to:
  receive a read request for an instruction;
  set an inuse field to indicate the instruction is in use in the ITLB, said inuse field being associated with an address translation for the instruction;
  send the address translation from the ITLB in response to the read request; and
  said set the inuse field to indicate the instruction is in use in the ITLB comprises:
    determine whether the address translation is in the ITLB;
    if the address translation is in the ITLB, then:
      set the inuse field associated with the address translation to indicate the address translation is in use; and if the address translation is not in the ITLB, then:
  transmit an external read request for the instruction;
  receive the instruction in response to the external read request;
  determine whether there are any address translations in the ITLB that are not in use;
  if there are no address translations in the ITLB that are not in use, then:
    clear the pipelined processor; and
    reset all ITLB inuse fields to indicate the address translations are not in use;
  select an address translation from the ITLB that is not in use;
  replace the selected address translation that is not in use with the address translation for the instruction; and
  set the inuse field associated with the address translation for the instruction to indicate the address translation is in use.

17. The computer system of claim 16, wherein said set an inuse field to indicate the instruction is in use in the ITLB further comprises:
  set the inuse field associated with the address translation to indicate the address translation is in use, if the address translation is in the ITLB.

18. The computer system of claim 16, wherein said determine whether there are any address translations in the ITLB that are not in use comprises:
  search the ITLB for an address translation that is not in use.

19. A computer system comprising:
  a pipelined processing unit comprising an instruction cache (ICACHE);
  a memory unit coupled to said processing unit, said memory unit having stored thereon machine-executable instructions; and
  a cache control protocol to control the use of the ICACHE, said cache control protocol being able to:
  receive a read request for an instruction;
  send the instruction in response to the read request;
  set an inuse field to indicate the instruction is in use, said inuse field being associated with the instruction in the ICACHE; and
  said send the instruction in response to the read request comprises:
    determine whether the instruction is in the ICACHE; and
    if the instruction is in the ICACHE, then:
      send the instruction from the CACHE;
    if the instruction is not in the ICACHE, then:
      transmit an external read request for the instruction;
      receive the instruction in response to the external read request;
      determine whether there are any instructions in the ICACHE that are not in use;
      if there are no instructions in the CACHE that are not in use, then:
        clear the pipelined processing unit;
        reset all ICACHE inuse fields to indicate the instructions are not in use;
      select an instruction from the ICAHE that is not in use;
      replace the selected instruction from the ICACHE that is not in use with the instruction; and
      send the instruction from the ICACHE.

20. The computer system of claim 19, wherein said send the instruction in response to the read request further comprises:
  send the instruction from the first memory, if the instruction is in the first memory.

21. The computer system of claim 19, wherein said clear the pipelined processing unit comprises:
  empty all objects that are protected by inclusion in the pipelined processing unit.

22. An apparatus comprising:
  a first memory coupled to a pipelined processor to store a plurality of instructions; and
  a second memory coupled to said first memory to store a plurality of address translations for at least said plurality of instructions and
  receive a read request for an instruction in said plurality of instructions,
  set an inuse field to indicate the instruction is in use in an instruction translation look aside buffer (ITLB), said inuse field being associated with an address translation for the instruction;
  said first memory to:
  send the address translation from the ITLB in response to the read request;
  said set the inuse field to indicate the instruction is in use in the ITLB comprises:
    determine whether the address translation is in the ITLB;
    if the address translation is in the ITLB, then:
      set the inuse field associated with the address translation to indicate the address translation is in use; and
    if the address translation is not in the ITLB, then:
      transmit an external read request for the instruction;
      receive the instruction in response to the external read request;
      determine whether there are any address translations in the ITLB that are not in use;
      if there are no address translations in the ITLB that are not in use, then:
        clear the pipelined processor; and
        reset all ITLB inuse fields to indicate the address translations are not in use;
      select an address translation from the ITLB that is not in use;
      replace the selected address translation that is not in use with the address translation for the instruction; and
      set the inuse field associated with the address translation for the instruction to indicate the address translation is in use.

23. The apparatus of claim 22, wherein said set an inuse field to indicate the instruction is in use in the ITLB further comprises:
  set the inuse field associated with the address translation to indicate the address translation is in use, if the address translation is in the ITLB.

24. The apparatus of claim 22, wherein said determine whether there are any address translations in the ITLB that are not in use comprises:
  search the ITLB for an address translation that is not in use.

25. An apparatus comprising:
  a first memory coupled to a pipelined processor, said first memory to store a plurality of instructions;
  a second memory coupled to said first memory, said second memory to store a plurality of address translations for at least said plurality of instructions;

said first memory being able to:
receive a read request for an instruction;
send the instruction in response to the read request;
set an inuse field to indicate the instruction is in use, the inuse field being associated with the instruction in an instruction cache (ICACHE);
said send the instruction in response to the read request comprises:
determine whether the instruction is in the ICACHE;
if the instruction is in the ICACHE, then:
send the instruction from the CACHE
if the instruction is not in the ICACHE, then:
transmit an external read request for the instruction;
receive the instruction in response to the external read request;
determine whether there are any instructions in the ICACHE;
if there are no instructions in the ICACHE that are not in use, then:
clear the pipelined processor;
reset all CACHE inuse fields to indicate the address translations are not in use; and
select an instruction from the ICAHE that is not in use;
replace the not instruction from the ICACHE that is not in use with the instructions; and
send the instruction from the CACHE.

26. The apparatus of claim 25, wherein said send the instruction in response to the read request further comprises:
send the instruction from the first memory, if the instruction is in the first memory.

27. The apparatus of claim 25, wherein said clear the pipelined processor comprises:
empty all objects that are protected by inclusion in the pipeline processor.

28. A pipelined, multi-processor computer system, each processor of said pipelined, multi-processor computer system comprising:
a pipelined processing unit having an instruction cache (ICACHE) and an instruction translation look-aside buffer (ITLB);
a memory unit coupled to said pipelined processing unit, said memory unit having stored thereon computer-executable instructions; and
a cache control protocol for controlling the use of the ICACHE and the ITLB, said cache control protocol being able to:
receive a read request for an instruction;
set an inuse field to indicate the instruction is in use in the ITLB, the in use field being associated with an address translation for the instruction;
send the address translation from the ITLB in response to the read request; and
said set the inuse field to indicate the instruction is in use in the ITLB comprises:
determine whether the address translation is in the ITLB;
if the address translation is in the ITLB, then:
set the inuse field associated with the address translation to indicate the address translation is in use; and
if the address translation is not in the ITLB, then:
transmit an external read request for the instruction;
receive the instruction in response to the external read request;
determine whether there are any address translations in the ITLB that are not in use;
if there are no address translations in the ITLB that are not in use, then:
clear the pipelined processing unit; and
reset all ITLB inuse fields to indicate the address translations are not in use;
select an address translation from the ITLB that is not in use;
replace the selected address translation that is not in use with the address translation for the instruction; and
set the inuse field associated with the address translation for the instruction to indicate the address translation is in use.

29. The pipelined, multi-processor computer system of claim 28, wherein said set the inuse field to indicate the address translation is in use in the ITLB further comprises:
set the inuse field associated with the address translation to indicate the address translation is in use, if the address translation is in the ITLB.

30. The pipelined, multi-processor computer system of claim 28, wherein said determine whether there are any address translations in the ITLB that are not in use comprises:
search the ITLB for an address translation that is not in use.

31. A method comprising:
setting a plurality of inuse fields associated with a plurality of storage locations for a plurality of objects to indicate that said plurality of objects are in use;
determining all of the plurality of inuse fields associated with the plurality of storage locations for the plurality of objects are set to indicate that said plurality of objects are in use;
clearing a pipelined processor; and
resetting all of the plurality of inuse fields associated with the plurality of storage locations for the plurality of objects to indicate that said plurality of objects are not in use.

32. The method of claim 31 further comprising:
selecting one of the plurality of objects that is not in use;
replacing the selected object that is not in use with a new object; and
setting the inuse field associated with the new object to indicate that the new object is in use.

33. A method comprising:
setting a first plurality of inuse fields associated with a first plurality of storage locations for a first plurality of objects to indicate that said first plurality of objects are in use;
setting a second plurality of inuse fields associated with a second plurality of storage locations for a second plurality of objects to indicate that said second plurality of objects are in use;
determining all of the first plurality of inuse fields associated with the first plurality of storage locations for the first plurality of objects are set to indicate that said first plurality of objects are in use;
determining all of the second plurality of inuse fields associated with the second plurality of storage locations for the second plurality of objects are set to indicate that said second plurality of objects are in use;

clearing a pipelined processor;

resetting all of the first plurality of inuse fields to indicate that said first plurality of objects are not in use; and resetting all of the second plurality of inuse fields to indicate that said second plurality of objects are not in use.

34. The method of claim 33 further comprising:

selecting one of the first plurality of objects that is not in use;

selecting one of the second plurality of objects that is not in use;

replacing the selected one of the first plurality of objects that is not in use with a first new object;

replacing the selected one of the second plurality of objects that is not in use with a second new object;

setting the inuse field associated with the first new object to indicate that the first new object is in use; and setting the inuse field associated with the second new object to indicate that the second new object is in use.

* * * * *

UNITED STATES PATENT AND TRADEMARK OFFICE
CERTIFICATE OF CORRECTION

PATENT NO. : 6,591,344 B2  
DATED : July 8, 2003  
INVENTOR(S) : Kyker et al.

It is certified that error appears in the above-identified patent and that said Letters Patent is hereby corrected as shown below:

Column 17,  
Lines 48 and 55, change "CACHE" to -- ICACHE --.  
Line 60, change "ICAHE" to -- ICACHE --.

Column 19,  
Lines 22 and 28, change "CACHE" to -- ICACHE --.  
Line 24, change "ICAHE" to -- ICACHE --.

Signed and Sealed this

Seventeenth Day of August, 2004

JON W. DUDAS  
*Acting Director of the United States Patent and Trademark Office*